United States Patent [19]
Nickerson et al.

[11] Patent Number: 5,713,116
[45] Date of Patent: Feb. 3, 1998

[54] CLINCH-TYPE LOCK NUT INSTALLATION AND FORMATION PROCESS

[75] Inventors: John L. Nickerson, Scottsdale, Ariz.; Kenneth A. Swanstrom, Doylestown, Pa.

[73] Assignee: Penn Engineering & Manufacturing Corp., Danboro, Pa.

[21] Appl. No.: 502,156

[22] Filed: Jul. 13, 1995

[51] Int. Cl.[6] ............................................. B23P 11/00
[52] U.S. Cl. .............................. 29/243.518; 29/243.519; 29/283.5; 29/505
[58] Field of Search .......................... 29/283.5, 243.5, 29/243.517, 243.518, 243.519, 515, 505

[56] References Cited

U.S. PATENT DOCUMENTS

| | | |
|---|---|---|
| 1,767,219 | 6/1930 | Maclean . |
| 2,310,007 | 2/1943 | Wolff ................................. 29/505 |
| 3,441,073 | 4/1969 | Johnson . |
| 3,969,809 | 7/1976 | Pouch et al. ..................... 29/243.519 |
| 4,309,806 | 1/1982 | Cilione ............................ 29/243.519 |
| 4,584,753 | 4/1986 | Eckold et al. ...................... 29/243.5 |
| 4,610,072 | 9/1986 | Muller .............................. 29/243.519 |
| 4,642,869 | 2/1987 | Muller . |
| 4,760,634 | 8/1988 | Rapp ................................ 29/243.519 |
| 4,910,853 | 3/1990 | Sawdon ............................. 29/283.5 |
| 5,315,743 | 5/1994 | Scheicher .......................... 29/243.5 |
| 5,335,411 | 8/1994 | Muller et al. ....................... 29/515 |

*Primary Examiner*—Timothy V. Eley
*Assistant Examiner*—Lee Wilson
*Attorney, Agent, or Firm*—Gregory J. Gore

[57] ABSTRACT

A two-tiered punch having an extending imprint head with impact surfaces is employed to deform the top threads of a clinch-type nut during installation to create a lock-type nut. As the deforming imprint is applied, a shoulder on the punch supplies the installation pressing force against the top face of the nut. As the imprint head moves downward into the material of the nut, portions of the top thread are deformed, being compressed axially downward. The size of the imprint head and the distance that the imprint head projects from the shoulder determines the depth of imprint deformation and, hence, the degree of thread deformation. The imprint head is centered on the nut thread and is configured in the shape of a polygon extending from the face of the punch. During deformation and installation, the nut is held in a center position with regard to the coining edges of the imprint head by a centering pin which extends from the end face of the punch. The distortion of the threads provides the desired prevailing torque against a thread-in bolt.

9 Claims, 2 Drawing Sheets

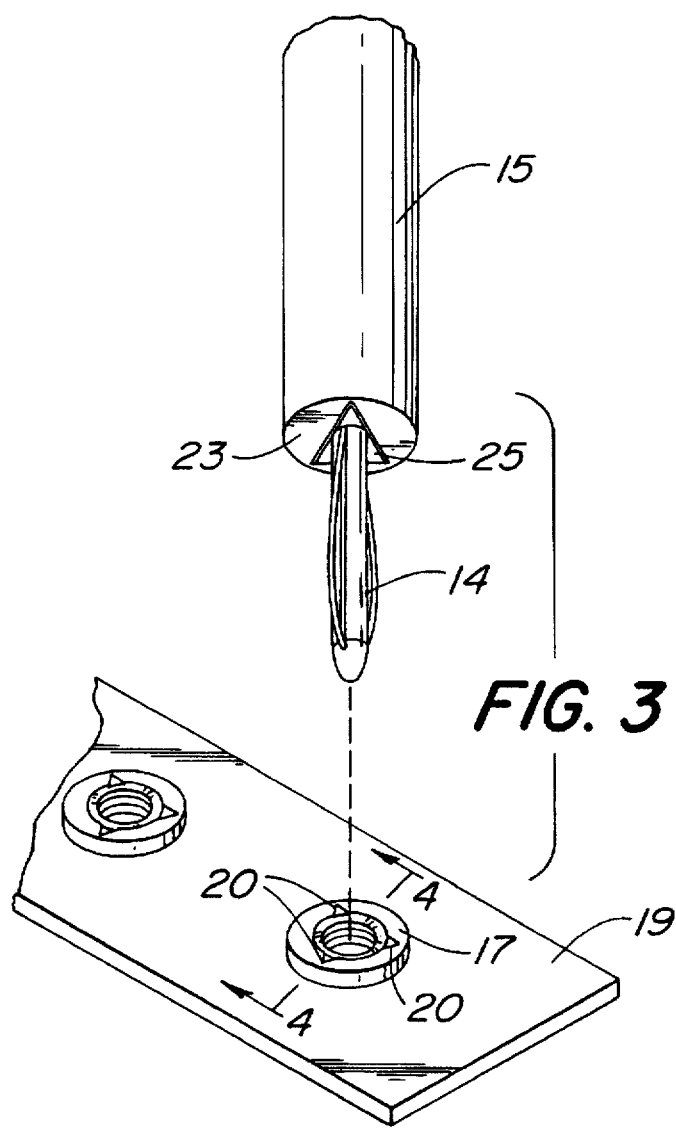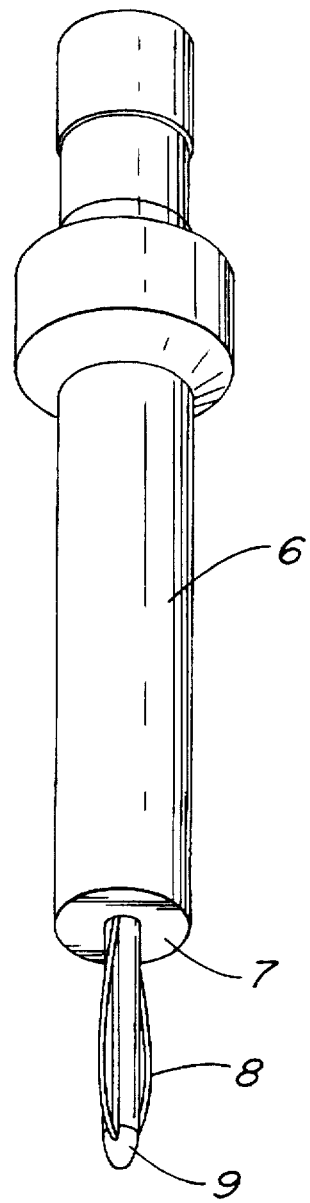
FIG. 3
FIG. 4
FIG. 5
PRIOR ART

CLINCH-TYPE LOCK NUT INSTALLATION AND FORMATION PROCESS

FIELD OF THE INVENTION

This invention relates to a process for attaching a threaded nut to a metal sheet while simultaneously deforming the threads in a controlled fashion to produce a self-locking nut. Lock nuts of this type have deformed threads which produce a high friction fit with the engaged threaded bolt, commonly called a "prevailing torque".

BACKGROUND OF THE INVENTION AND DESCRIPTION OF PRIOR ART

Clinch-type nuts are commonly installed in sheet metal as a convenient and inexpensive means for providing a thin ductile metal sheet with a strong threaded portion into which threaded bolts can be secured. Nuts of this type are pressed into preformed holes in the sheet with a simple, flat-faced punch as shown in FIG. 5. The punch 6 includes a face 7 which impacts the flat-faced top surface of the nut. The punch may include a center pin 9 with a nut-retaining spring 8. Installation pressure applied between the top surface of the nut and an anvil on the opposite side of the sheet causes the metal around the installation hole to cold-flow into a groove around the bottom of the nut. In the event that a locking clinch-type nut is desired, the locking characteristics of the nut are formed in a separate manufacturing step prior to the installation of the nut into the sheet.

It is known to create lock nuts by impacting a sloped top portion of the nut with an impacting tool which causes the internal threads to be forced radially inward. Impact tools have also been devised to axially deform the top thread to provide a higher prevailing torque simultaneous with nut wall compression. Such a process of lock-nut formation is described in U.S. Pat. No. 3,441,073 issued to K. L. Johnson on Apr. 29, 1969.

It is also known to deform the threads of a nut to provide a locking, prevailing torque simultaneously with the installation of a piercing-type nut which cuts its receiving hole into the sheet as it is pressed in. Pierce nuts utilizing this process are described in U.S. Pat. No. 4,642,869 issued to R. Muller on Feb. 17, 1987. As with the Johnson lock nut formation process described above, the Muller pierce nuts have a sloped top face which is radially compressed inward by a ram having a recess with sloped sides that acts against the face of the nut. The radial compression reduces the internal diameter of the threads to produce a prevailing torque against a threaded-in bolt. In the Muller process, the pierce nut is installed into the sheet and the nut threads forced inward in a single pressing step; however, it is necessary that the nut compression force be less than the piercing force of the sheet. This limits the Muller process to either nuts of a soft material, or thick metal sheets having a high pierce force.

It is also known to form a simple lock nut by corrugating the uppermost threads at the top of the nut by impacting the nut with a sharp tool which cuts V-shaped, axially-applied grooves into a dome-shaped top face of the nut. This process is disclosed in U.S. Pat. No. 1,767,219 issued to J. A. McLean on Jun. 24, 1930.

While some of the above prior art shows methods and structures for simultaneously installing and deforming nut threads in order to provide an installed locking nut, these processes require a nut with sloping sides and a corresponding ram which centers and compresses the nut. Clinch-type, flat-faced nuts, however, present different engineering problems to obtain a controlled deformation of threads to provide the desired prevailing torque against an installed bolt. Furthermore, they offer the advantage of a low-profile, compared to nuts having an inclined face.

SUMMARY OF THE INVENTION

The present invention permits the simultaneous installation and thread deformation of a clinch-type nut in a single step which can provide consistent thread deformation of the nut, regardless of the thickness of the sheet to which it is applied. This is achieved by the use of a two-tiered punch having an extending imprint head with impact surfaces that deform the top threads of the nut during installation. The imprint head lies in a plane parallel to a face on the punch tip. Simultaneously, as the deforming imprint is applied, the shoulder supplies the installation pressing force against the top face of the nut. Once the size of the imprint head has been selected, the distance that the imprint head projects from the shoulder surface will consistently determine the depth of the imprint deformation and, therefore, the degree of thread deformation. As the imprint head moves downward into the material of the nut, portions of the top thread are compressed axially downward. This axial compression distorts the threads to provide the desired prevailing torque against a threaded-in bolt.

The imprint head is centered on the nut thread and is configured in the shape of a polygon extending from the face of the punch. The sides of the polygon are positioned approximately tangential to the nut thread aperture. The impact surfaces which lie at the corners of the polygon are positioned, on impact, a small distance beyond the outer diameter of the threaded aperture so that during impact the top thread is compressed axially without being enlarged or compressed radially. The imprint points are adjacent to the nut aperture and are equally spaced around its circumference.

The height and dimension of the imprint head impact surface is critical to the thread deformation process. By selecting the correct dimensions and materials, a pressing force needed to simultaneously deform the thread may be greater or less than the force required to press the clinch nut into the sheet. Therefore, the thread deformation and nut installation may be achieved simultaneously by a single stroke of the ram without changing the nut installation force, regardless of the forcible resistance of the sheet. Holding the nut in a centered position with regard to the coining edges of the imprint head is also essential to the controlled deformation of the threads. It has been found that this centering function may be provided by a centering pin which extends from the end face of the punch.

Specifically, the applicant has invented an apparatus for installing a clinch nut, comprising: a press with a ram having a stroke movable along a path between advance and retracted positions; a punch extending from the bottom of the ram, the punch having an end face; a clinch nut having a thread aperture, the nut positioned in an aperture on a metal sheet in alignment with the path of the punch; and an imprint head extending a distance from the face of the punch such that when the ram is moved to its advance position, the imprint head impacts the top of the nut and deforms the internal threads. The punch has a face at the force-applying end which includes a shoulder and a centering pin extending axially therefrom. The imprint head includes a planar impact surface parallel to the shoulder. The centering pin passes through the nut aperture to center the nut on the imprint head.

The applicant has also devised a method for simultaneously applying and forming a lock-type clinch nut, comprising: placing a clinch nut in an aperture of a metal sheet; advancing a punch against the top of the clinch nut; impacting the nut with the punch and deforming the material in selected areas adjacent to the threaded aperture of the nut by a raised imprint head on the punch face and being centered on the threaded aperture; further continuing the advancement of the punch against the nut to forcibly drive the nut against the metal sheet to fasten the nut thereto by deformation of the metal sheet; and finally advancing the punch against the nut and a supporting anvil to fully distort the threads of the nut.

Thus, the punch and method of the present invention provides the consistent and controlled installation and thread deformation of clinch nuts in a one-step operation. Other objects, advantages and novel features of the invention will become apparent from the following detailed description of the invention when considered in conjunction with the accompanying drawings.

BRIEF DESCRIPTION OF THE DRAWINGS

FIG. 3 is a front right isometric view showing the punch and an installed clinch nut.

FIG. 4 is side sectional view taken from FIG. 3 as shown in that figure.

FIG. 5 is a front bottom isometric view of a prior art punch.

DESCRIPTION OF THE PREFERRED EMBODIMENT

Figure 1:
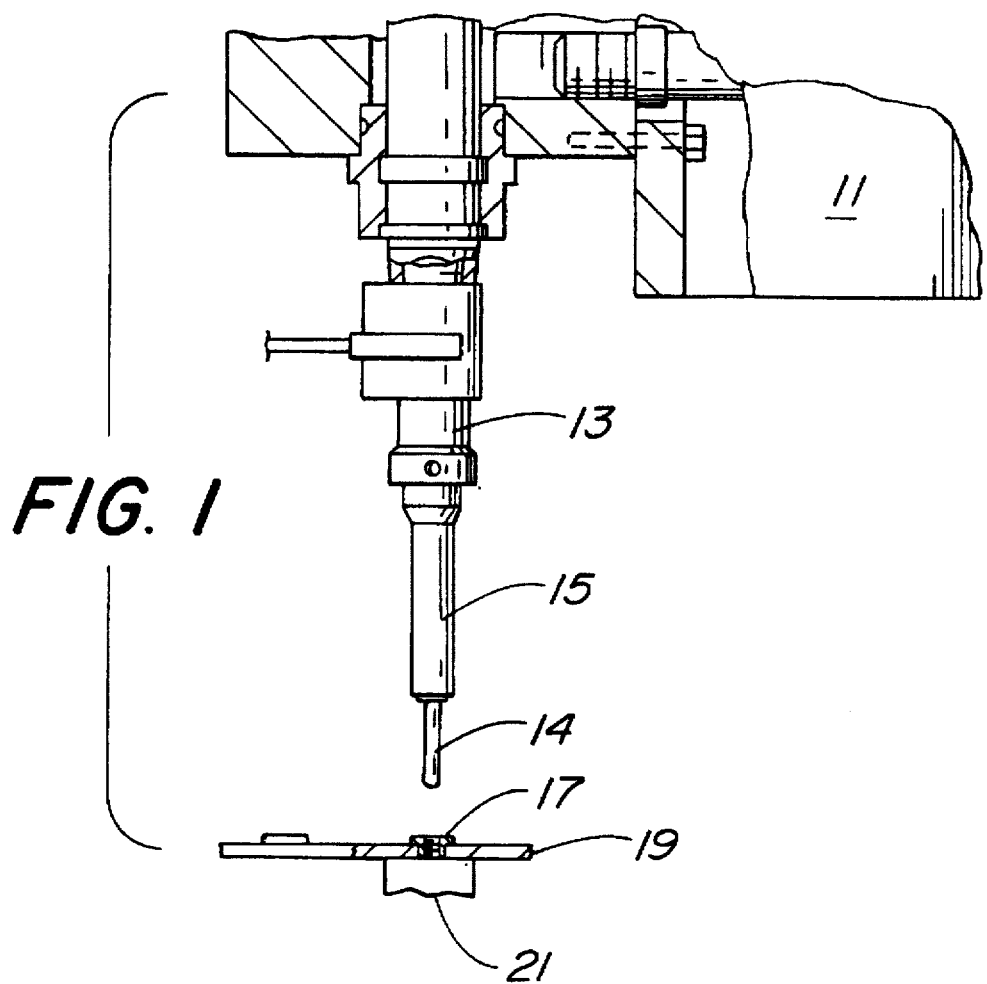
FIG. 1 shows a side view of the punch press which utilizes the present invention.

FIG. 1 shows the environment of the present invention which includes an industrial press 11 with a ram 13 which holds a punch 15 having a centering pin 14. At the end of the downward stroke of the ram, the punch forces clinch-type fastener 17 into sheet 19. As the nut is pressed against the sheet, anvil 21 causes a cold flow of metal of sheet 19 into a recessed groove at the bottom of clinch nut 17, thus securing the nut to the sheet.

Figure 2:
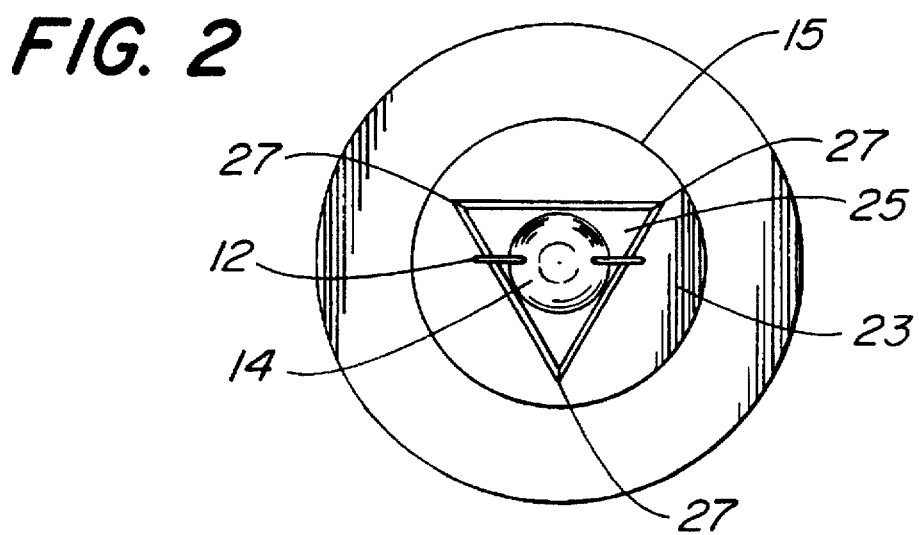
FIG. 2 is a bottom view of the ram tip shown in FIG. 3.

The punch of the present invention is specially designed to achieve the formation of a lock-type nut as further described herein. The bottom view of the punch 15 shown in FIG. 2 depicts a face 23 in the form of a shoulder which surrounds a triangular imprint head 25, and centering pin 14 on the pressing tip at the end of the punch. The centering pin includes resilient retaining wires 12 which hold the nut from falling off the centering pin during the installation process. As seen in this figure, the imprint head 25 is in the shape of a triangle having three corners 27. The corners of the imprint head are the major impact surfaces that carry the majority of the thread-deforming force as the head is depressed into the top face of the nut.

Referring now to FIG. 3, both the construction of the punch and its relationship to an installed fastener is depicted. As shown, fastener 17 has been installed into sheet 19 after a single pressing stroke has been applied by punch 15. The triangular imprint head 25 has sides which are directly adjacent to the circumference of the centering pin 14. The face of the nut 17 includes flat deformations 20 which occur around the circumference of the nut thread aperture corresponding to the corners of a raised triangular imprint head on the tip of the punch which created them. It is important that the deformations of the nut are flat impressions, rather than cuts which can tear through the threads. Cuts through the metal may produce sharp edges and pieces of metal may break off in the thread area when a bolt is installed. This can create several problems, including damage to the bolt and loss of the desired degree of prevailing torque.

Referring now to FIG. 4, a side-sectional view of the clinch nut 17 shows the deformation to the top thread of the nut after installation into sheet 19. The flat deformations in areas 22 and 24 cause friction with the mating threads of an installed bolt to provide a prevailing torque.

By using the above-described punch, a clinch nut may be installed and locking-type threads formed in a single stroke of the installing press. Since punches of most industrial presses are easily replaced, the change over from a prior art punch as shown in FIG. 5, to the punch of the present invention which produces lock nuts, is fast, convenient and requires no other adjustment to the press.

Installation of clinch-type nuts using the punch of the present invention is carried out as follows. As the tip of the punch meets the top face of the nut, the imprint head first contacts the face of the nut. The high force-per-area loading at the impact site of the imprint head corners pushes them into, and deforms the face of the nut around the threaded aperture. As the punch moves downward, the deformations become deeper and axially distort the internal threads of the nut. As the punch continues downward farther, the punch face contacts peripheral areas around the circumference on the top of the nut which drives the nut into the sheet until the installation of the fastener is completed.

The present invention provides many advantages over the prior art. The type of nut material and the head impact area may be selected so that the required deformations can be created either before or after the nut is fully installed. Therefore, deformations of consistent depth are performed, being always equal to height of the imprint head from the face of the punch, regardless of the properties of the sheet. The present process is also easily controllable because both the punch face and face of the nut are perpendicular to the direction of the stroke of the punch so that there is no tendency for the nut to be deflected sideways. Furthermore, the face of the punch transmits force equally about the full circumference of the nut.

It should be understood that the above description discloses specific embodiments of the present invention and are for purposes of illustration only. There may be other modifications and changes obvious to those of ordinary skill in the art that fall within the scope of the present invention which should be limited only by the following claims and their legal equivalents.

What is claimed is:

1. A punch for deforming threads of a nut, comprising:
   a punch having a face at a force-applying end, said face including a centering pin extending axially therefrom; and
   a raised imprint head on said punch face located centered around said centering pin, said imprint head being a planar impact surface parallel to said face.

2. The punch of claim 1, wherein said imprint head has a polygonal shape.

3. An apparatus for installing a clinch nut, comprising:
   a press with a ram having a stroke movable along a path between advance and retracted positions;
   a punch extending from a bottom of said ram, said punch having an end face;
   a clinch nut having a thread aperture, said nut positioned in an aperture on a metal sheet in alignment with the path of said punch; and an imprint head having a planar inpact surface and extending a distance from the end face of said punch such that when said ram is moved to its advance position, said imprint head impacts the top of said nut and deforms said internal threads.

4. The apparatus of claim 3, further described in that said imprint head lies in a single plane parallel to the top of the nut and perpendicular to the stroke of said ram.

5. The apparatus of claim 4, wherein said end face lies in a plane parallel to said imprint head.

6. The apparatus of claim 5, further including a centering pin to center the nut thread aperture on the imprint head.

7. The apparatus of claim 6, wherein said imprint head is in the shape of a polygon.

8. The apparatus of claim 7, wherein said imprint head is triangular.

9. An apparatus for installing a clinch nut, comprising:

a press with a ram having a stroke movable along a path between advance and retracted positions;

a punch having a face at a force-applying end, said face including a centering pin extending axially therefrom;

a raised imprint head on said punch face located centered around said centering pin, said imprint head being a planar impact surface parallel to said face;

a clinch nut having a thread aperture, said nut positioned in an aperture on a metal sheet in alignment with the path of said punch; and the imprint head extending a distance from the end face of said punch such that when said ram is moved to its advance position, said imprint head impacts the top of said nut and deforms said internal threads.

* * * * *